United States Patent [19]

Swift et al.

[11] Patent Number: 5,093,654

[45] Date of Patent: Mar. 3, 1992

[54] THIN-FILM ELECTROLUMINESCENT DISPLAY POWER SUPPLY SYSTEM FOR PROVIDING REGULATED WRITE VOLTAGES

[75] Inventors: Steven D. Swift, Seattle; Roger E. Baker, Redmond, both of Wash.

[73] Assignee: Eldec Corporation, Lynnwood, Wash.

[21] Appl. No.: 353,102

[22] Filed: May 17, 1989

[51] Int. Cl.⁵ .............................................. G09G 3/00
[52] U.S. Cl. .................................. 340/781; 340/813; 313/498; 315/169.3
[58] Field of Search ............... 340/760, 767, 781, 793, 340/713, 812, 813; 313/498, 500, 501, 505, 511, 512; 315/169.3; 323/255, 258, 905

[56] References Cited

U.S. PATENT DOCUMENTS

| | | | |
|---|---|---|---|
| 3,263,028 | 7/1966 | Shanafelt et al. | 178/7.3 |
| 3,280,341 | 10/1966 | DuVall | 340/813 X |
| 3,335,318 | 8/1967 | Yancey | 323/905 X |
| 3,651,511 | 3/1972 | Andrews et al. | 340/767 |
| 3,765,011 | 10/1973 | Sawyer et al. | |
| 3,778,673 | 12/1973 | Eisenberg et al. | 340/767 |
| 3,811,071 | 5/1974 | Ogle | 340/812 |
| 3,975,661 | 8/1976 | Kanatani et al. | 340/760 |
| 4,100,460 | 7/1978 | Spence | 315/162 |
| 4,109,245 | 8/1978 | Hedin | 340/760 |
| 4,114,366 | 9/1978 | Renner et al. | 340/767 X |
| 4,123,751 | 10/1978 | Gladstone et al. | 340/767 X |
| 4,234,821 | 11/1980 | Kako et al. | 315/169.3 |
| 4,241,294 | 12/1980 | Fisler | 340/767 X |
| 4,302,751 | 11/1981 | Nakauchi et al. | 340/813 X |
| 4,385,294 | 5/1983 | Miles | 340/713 X |
| 4,443,741 | 4/1984 | Tanaka et al. | 340/781 X |
| 4,468,968 | 9/1984 | Kee | 73/708 |
| 4,481,412 | 11/1984 | Fields | 235/472 |
| 4,481,804 | 11/1984 | Eberhard et al. | 73/1 G |
| 4,514,727 | 4/1985 | Van Antwerp | 340/812 X |
| 4,555,776 | 11/1985 | Maesnas, Jr. | 365/202 |
| 4,562,450 | 12/1985 | Ellis, Jr. et al. | 340/811 X |
| 4,571,053 | 2/1986 | Kasama et al. | 340/767 X |
| 4,581,655 | 4/1986 | Ide et al. | 358/242 |
| 4,586,039 | 4/1986 | Nonomura et al. | 340/813 X |
| 4,621,643 | 11/1986 | New, Jr. et al. | 128/633 |
| 4,700,708 | 10/1987 | New, Jr. et al. | 128/633 |
| 4,751,509 | 6/1988 | Kubota et al. | 340/783 X |
| 4,760,389 | 7/1988 | Aoki et al. | 340/793 X |
| 4,770,179 | 9/1988 | New, Jr. et al. | 128/633 |
| 4,792,928 | 12/1988 | Tobita | 365/202 X |
| 4,897,639 | 1/1990 | Kanayama | 340/812 |
| 4,922,243 | 5/1990 | Kozicki et al. | 340/813 |
| 4,962,374 | 10/1990 | Fujioka et al. | 340/781 |

FOREIGN PATENT DOCUMENTS 61-169823A 7/1986 Japan .

OTHER PUBLICATIONS

IBM Technical Disclosure Bulletin, vol. 8, No. 8, Jan. 1966, entitled "Lamp Intensity Control" by D. A. Schoonover et al.

Channing et al. "EL Addressing Technology," Society for Information Display-International Symposium 1989, Digest of Technical Papers, vol. XX, pp. 54–57 presented May 16, 1989.

*Primary Examiner*—Alvin E. Oberley
*Assistant Examiner*—Richard Hjerpe
*Attorney, Agent, or Firm*—Christensen, O'Connor, Johnson & Kindness

[57] ABSTRACT

A power supply system for controlling the drive voltages applied to a thin film electroluminescent (TFEL) display panel is disclosed. The system includes a power supply that generates the drive voltages to the TFEL display panel and causes it to emit light. A replaceable or resettable display voltage memory located adjacent the display panel provides the power supply with voltage information specific to the display panel. A feedback circuit measures the light emitted from the display panel. A balancing circuit controls multiple display voltages so that they have the proper relationship with respect to each other. The information from the display voltage memory and the feedback circuit is used by the power supply to control the output of the display voltages.

28 Claims, 7 Drawing Sheets

THIN-FILM ELECTROLUMINESCENT DISPLAY POWER SUPPLY SYSTEM FOR PROVIDING REGULATED WRITE VOLTAGES

FIELD OF THE INVENTION

This invention relates generally to the field of thin-film electroluminescent displays, and, more specifically, to a power supply system for regulating the voltages that are applied to a thin-film electroluminescent display panel that cause it to emit light.

BACKGROUND OF THE INVENTION

Thin-film electroluminescent (TFEL) display panels are becoming a popular device for providing real time visual representations of information. A TFEL display panel comprises an active layer of material that is sandwiched between two sets of electrodes that are typically perpendicular with respect to each other. When an electromotive potential, a voltage, is established between the two electrodes across the active layer, the active layer at that location becomes electrically excited and emits photons, or light, which is observed by a viewer. By selectively establishing voltages between the electrodes at various locations across the active layer, a TFEL display panel can be used to generate almost any type of visual representation, including images, graphics, and textual material.

TFEL display panels, and monitors that incorporate them, have a number of advantages over other types of video displays. TFEL display panels are significantly more compact, lightweight, rugged, and consume less power than cathode ray tubes which are large vacuum tubes that have interior surfaces with a layer of light-emitting material that requires significant voltages to emit light. TFEL display panels consume much less power than light-emitting diode (LED) displays which are formed from a large number of discrete LEDs that collectively consume so much power that they are unsuitable for large screen displays. Still another advantage of TFEL display panels is that they have wide viewing angles. In other words, the displayed image readily can be observed even when the viewer's perspective is significantly offset from being perpendicular to the face of the display. A further advantage of TFEL display panels is that they are readable in almost all light conditions, i.e., conditions of both very low and very high ambient light. These features make TFEL display panels more advantageous than other well-known displays such as liquid crystal displays (LCDs) that have limited viewing angles and require backlighting when only low ambient light is available.

Moreover, unlike other displays such as LEDs and LCDs, TFEL displays can readily be provided with an adjustable brightness control that allows the viewer to set display brightness to allow for changing ambient conditions or for individual preference. Accordingly, because of their advantages, there has been increasing interest in using TFEL display panels for avionics, automotive electronics, and other applications where it is desirable to provide the viewer with real time visual depictions of information that change rapidly, where the space for providing a display is minimal, the power available for driving a display is limited, and the ambient light is either not optimal and/or subject to change from optimal to that which is less.

Despite the advantages of TFEL display panels, there are still some limitations with them that have inhibited their application for many uses. These limitations have been associated with the drive voltages that are applied to TFEL display panels to cause them to emit light. These problems stem from the fact that the amount of light emitted, or brightness, at any one given point on a TFEL display, and at any given instant, is directly related to the drive voltages. The drive voltages necessary to cause a given amount of light to be emitted may vary from display to display, and may fluctuate in a single display panel over short periods of time as ambient conditions such as temperature change and over extended periods of use as the components forming the display change as an inherent part of the aging process.

The different drive voltage requirements of individual TFEL display panels can make it unduly troublesome to provide a TFEL monitor with a new display panel as may be required for repair or replacement purposes. Difficulties arise because each time a monitor is provided with an new or replacement display panel, significant amounts of time may be spent calibrating the monitor power supply that supplies the drive voltages so that when the voltages are applied, the display panel emits the desired brightness of light. Calibrating the monitor power supply is often further complicated because the calibration point, the point where the drive voltage adjustments to the power supply are made, is often located at a position in the monitor that is difficult to access.

Brightness-per-applied drive voltage fluctuations of a single TFEL display panel can adversely affect the operation of the monitor it is used with. As the display voltage necessary to emit a specific brightness changes, the display panel may either emit light when it is not supposed to, or not emit light when it should. Moreover, a viewer-set brightness control operates by controlling the level of the drive voltages applied to the TFEL display panel. Brightness-per-applied drive voltage fluctuations can radically alter the degree of brightness changes, as the display voltage is adjusted through changes in the brightness control setting. Thus, when the brightness control is set, there may be uneven variations in observed brightness levels that are both disconcerting and unsatisfactory to the viewer.

Other difficulties are associated with some TFEL display panels that are provided with a number of different voltages in order to cause the desired emission of light. One such type of TFEL display panel is an AC-TFEL display that emits light during the time the voltages are changing across the electrodes. A popular way of applying enough voltage to these display panels is to apply the necessary voltages twice, in short succession from each other. During the first write period, or frame, a positive write voltage is applied to one of the electrodes as part of the display voltage necessary to emit light. A short time thereafter, during a succeeding frame, a negative write voltage is applied as part of the necessary drive voltage. In most symmetrically driven TFEL display panels, the write voltages are alternately applied to all electrodes on one side of the active layer. The actual emission of light is controlled by selectively applying a modulation voltage to the opposite electrodes that, depending on the polarity of the applied write voltage, can or cannot establish a voltage across the active layer that results in the emission of visible light.

Problems arise with TFEL displays, including symmetrically driven TFEL displays, because, over time, the repeated applications of one of the drive voltages, in symmetrically driven displays the write voltages, may cause an electric potential or charge to become established in the components, including the active layer, forming the TFEL display panel. As a result of this charge formation, latent images of representations frequently represented on the display panel may appear. Latent images are typically of frames, textual information, or symbols that are repetitively produced on the display panel. Latent images can be "positive" images, faint outlines of images that always appear on the display panel even when they are not specifically being produced; they can also be "negative" images or shadows that should be fully illuminated but instead appear noticeably dimmer than adjacent illuminated regions of the display. Whatever type of latent image forms, it can detract from the image presented on the display panel, and significantly impair or disrupt the viewer's ability to perceive the intended image.

SUMMARY OF THE INVENTION

This invention comprises providing a TFEL display power supply system for providing a TFEL display panel with the drive voltages required to achieve desired degrees of display panel illumination. The power supply system provides the correct drive voltages to the associated display panel regardless of whether the display panel is a new or a substitute display panel, and regardless of fluctuations in the brightness-applied drive voltage profile of the panel. The power supply also regulates the levels of multiple voltages that may be applied to a display panel to reduce the formation of latent images on the panel.

The TFEL display power supply system of this invention includes a display voltage memory associated with each TFEL display panel that contains information regarding the display voltage requirements necessary to activate the display in order to cause a specific emission of light. The power supply system accesses the display voltage memory, and in response to the information obtained therefrom, controls the levels of the drive voltages that are applied to the TFEL display panel.

The power supply includes a feedback circuit for monitoring the brightness of the light emitted by the display, and in response thereto, adjusting the levels of the supplied drive voltages. The feedback circuit includes a concealed section of the display panel that is occasionally supplied with a drive voltage to cause light to be emitted. A photodetector is mounted adjacent the display panel in order to sense the brightness emitted from the concealed sections of the panel. The monitored brightness of the concealed panel section is used by the power supply system to further adjust the voltages that are applied to the display panel.

A balancing circuit within the power supply system regulates the different voltages that may be applied to the display panel, so that the required voltage is established across the active layer in order to cause the desired emission of light. In a power supply supplying voltages to a symmetrically driven AC display panel, the balancing circuit regulates the positive and negative write voltages so that they are symmetric with respect to a given reference voltage, often one-half the modulation voltage.

The display voltage memory circuit makes it possible to readily change the display panel that is used with a monitor. When a new TFEL display panel is installed in a monitor, the voltage information is accessed from the memory by the power supply system to control the display voltages applied to the display panel. This eliminates the time and expense associated with having a technician recalibrate the applied drive voltages each time a new display is installed in the monitor.

The feedback circuit provides indications of the brightness of light emitted by the display panel that are used to automatically adjust the applied levels of display voltage. When a display panel is first turned on, a test pattern can be applied to the concealed panel section that, in turn, is used by the feedback circuit to adjust the voltage applied to the display so that the appropriate degree of brightness to a normal or absolute level is obtained. During the operation of the monitor, the concealed panel sections can be regularly illuminated to provide an indication of the degree of brightness of the display so that further adjustments to the drive voltages, if necessary, can be made. The brightness information provided by the feedback circuit is also used by the power supply to control intermediate drive voltages applied when the brightness control is set. The intermediate drive voltages are adjusted so that when the brightness control is set, the resultant viewer-observed brightness changes are of uniform degree and not disconcerting to the eye. The feedback circuit thus automatically makes adjustments to the drive voltages provided by the power supply to compensate for brightness drive voltage fluctuations that occur over both short periods and long periods of time.

In a power supply used to provide drive voltages to a symmetrically driven TFEL display panel, the balancing circuit insures that the positive and negative write voltages are of equal magnitude. This minimizes the build up of electrical charge within the display panel that can contribute to the disruptive appearance of latent images. In some embodiments of the invention the light detected by the feedback circuit may be used to control the balancing of the drive voltages.

BRIEF DESCRIPTION OF THE DRAWINGS

The invention will be pointed out with particularity in the appended claims. The above and further advantages of the invention may be better understood by referring to the following detailed description taken in conjunction with the accompanying drawings, in which:

DETAILED DESCRIPTION OF THE INVENTION

Figure 1:
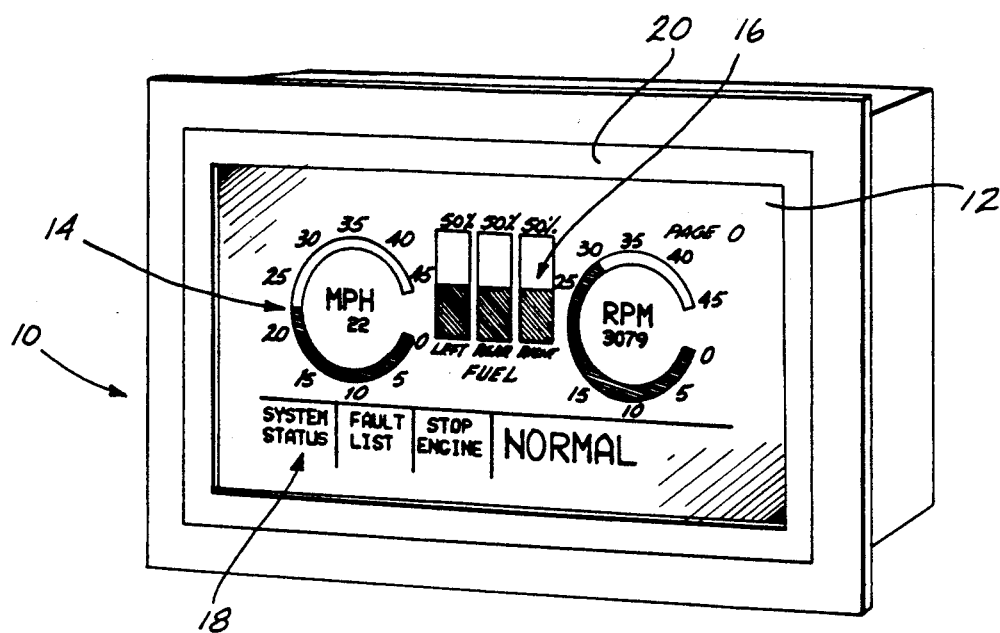
FIG. 1 is a perspective view of a basic TFEL display panel monitor.

FIG. 1 illustrates a video monitor 10 with a thin-film electroluminescent (TFEL) display panel 12 for producing visual representations of information. Depending on the demand of external signals supplied to the monitor 10, the display panel 12 can be used to generate displays in the form of imagery 14, graphics 16 or text 18. The display panel 12 is also capable of frequently updating the displayed information; for instance, the depicted representations of speed and rotation can be simultaneously updated to reflect changes in those parameters. A frame assembly 20 is used to secure the display panel 12 to the monitor 10.

Figure 2:
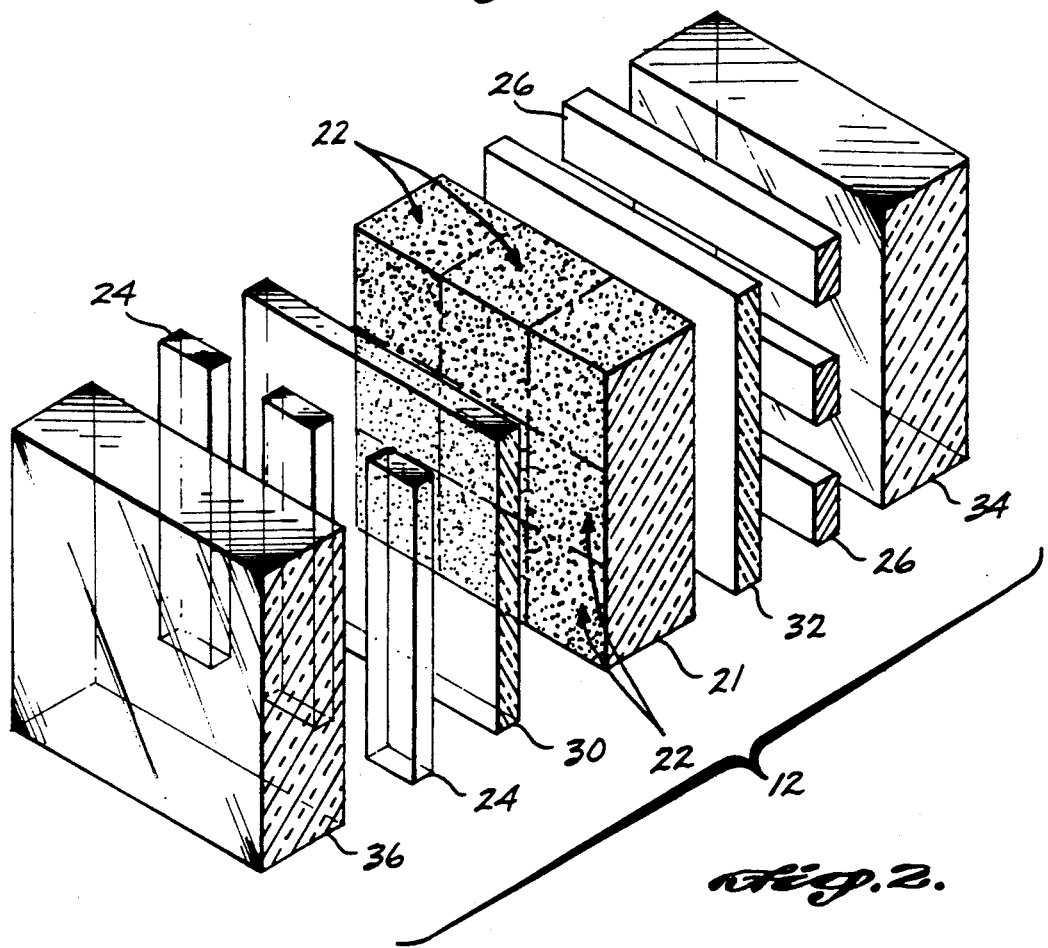
FIG. 2 is an exploded isometric view showing the construction of a basic TFEL display panel.

As shown in FIG. 2, the TFEL display panel 12 includes an active layer 21 typically of phosphor, that when excited by an electric potential, a voltage, emits photons, light. The active layer 21 is disposed between a set of column electrodes 24 located in the face of display panel 12, the portion of the panel the viewer sees, and a set of row electrodes 26 located in the rear of display panel. The column electrodes 24 and row electrodes 26 are normally arranged at an angle with each other. In the illustrated embodiment, the electrodes 24 and 26 are orthogonal with respect to each other. The sections of the active layer 21 between where specific column and row electrodes 24 and 26 intersect are referred to as pixels 22. Images are formed on the display panel 12 by applying drive voltages to selected column and row electrodes 24 and 26 so that selected pixels 22 are excited to the point where visible light is emitted.

The active layer 21 is electrically isolated from the column electrodes 24 by a front dielectric layer 30 and from the row electrodes 26 by a rear dielectric layer 32. The column electrodes 24 and front dielectric layer 30 are formed of transparent material so that the light emitted by the pixels 22 may pass therethrough and be observed by the viewer. The active layer-and-electrodes subassembly is sandwiched between a rear substrate 34 that the row electrodes 26 may be mounted on and a transparent front panel 36 adjacent the column electrodes 24. In a preferred embodiment of the display panel 12, the rear substrate 34 and front panel 36 are both formed from glass or other suitable dielectric material.

Figure 3:
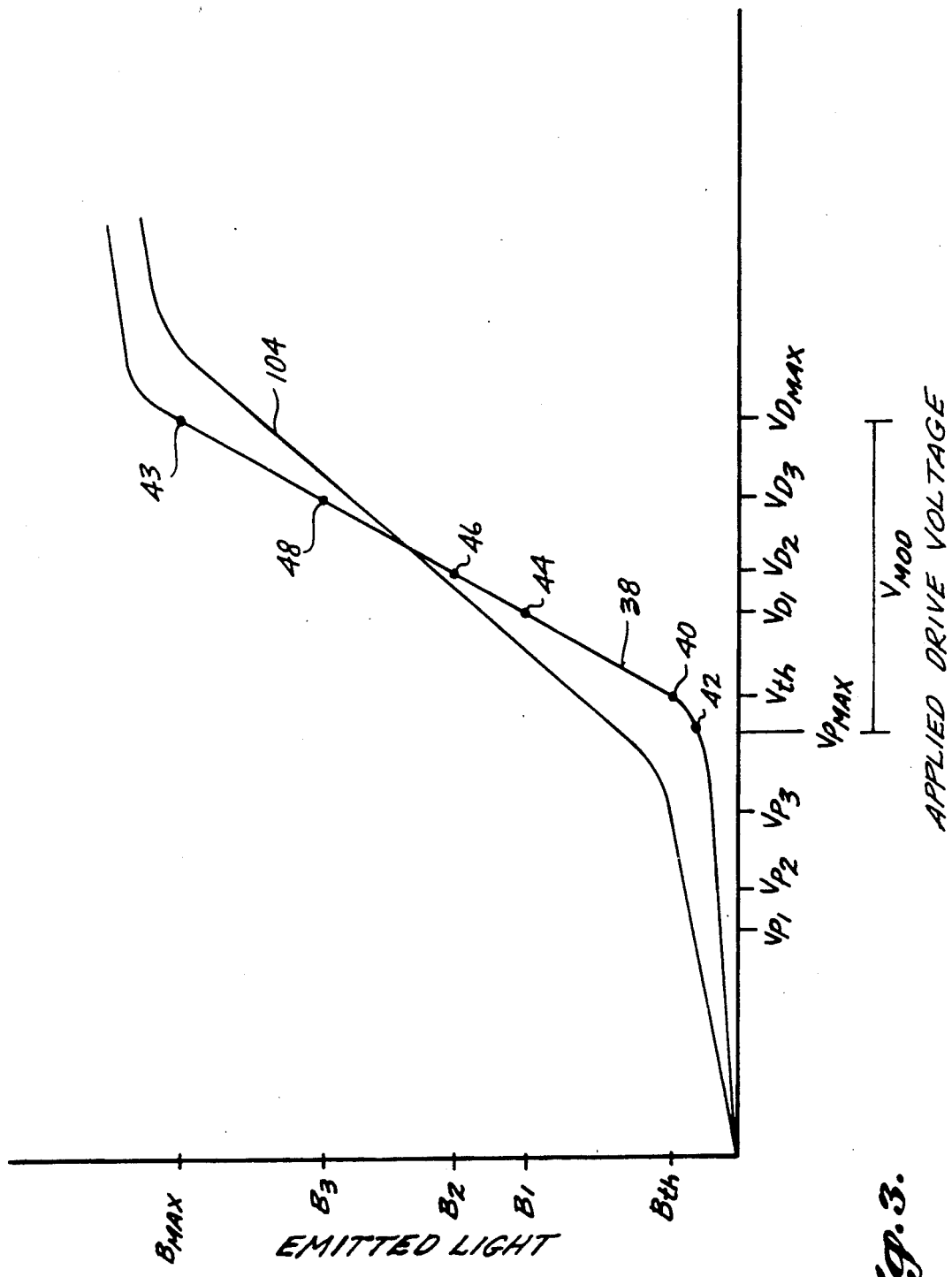
FIG. 3 is a graphic representation of the basic drive voltage-brightness profile for a TFEL display panel.

FIG. 3 illustrates a typical brightness-applied drive voltage profile for a typical TFEL display panel 12. Curve 38 represents the profile of the emitted light, or brightness, of the display panel for given drive voltage applied across the pixels 22. As is readily apparent, the curve 38 has an initial section where increases in display voltage cause only marginal increases in emitted light, a center section where minimal display voltage increases cause significant increases in emitted light, and a trailing section where additional increases in display voltage cannot cause the display panel 12 to emit light beyond a maximum brightness. On the curve 38 is a threshold point 40, $B_{th}$, below which the emitted light is generally not observable to the human eye, and above which the light is visible. The voltage required to cause the pixels to emit light at the threshold point 40 is the threshold voltage, $V_{th}$.

One common method of establishing a voltage across a pixel 22 to cause the emission of visible light is to first establish a preliminary voltage, $V_{Pmax}$, at a point 42 on the curve 38 below the threshold voltage across the pixel 22 on one of the electrodes 24 or 26. A modulation voltage, $V_{mod}$, of appropriate magnitude and polarity is then established on the complementary electrode 26 or 24 so that a display voltage, $V_{Dmax}$, point 43 on curve 38, of sufficient potential is established across the pixel 22 to cause the emission of light, $B_{max}$, bright enough to be observed. In practice, a form of preliminary voltage, a write voltage, is sequentially applied to the row electrodes 26 of a TFEL display panel 12. When the write voltage is applied to a particular row of electrodes 26, the column electrodes 24 are then selectively supplied with an appropriate modulation voltage, or grounded, so that an appropriate drive voltage is established across selected pixels 22 in the row causing the selected pixels 22 to emit light. Since the human eye registers changes in emitted light over slower periods of time than the changes actually occur, the viewer sees a complete image on the display panel 12, even though only a single row of pixels 22 is being illuminated at any one instant.

Brightness is controlled in many TFEL display panels 12 by controlling the level of the preliminary, or write, voltage that is initially applied to the electrodes 24 or 26. As depicted, intermediate preliminary voltages $V_{P1}$, $V_{P2}$, $V_{P3}$, below the primary preliminary voltage $V_{Pmax}$, are applied across the pixels 22. The modulation volution is then applied to the other electrodes 26 or 24 resulting in intermediate display voltages $V_{D1}$, $V_{D2}$, $V_{D3}$, developing across the pixels 22. The intermediate display voltages that develop across the pixels 22, points 44, 46 and 48 on curve 38, excite the pixels to emit visible light at brightness $B_1$, $B_2$, and $B_3$ noticeably dimmer than when the full display voltage, $V_{Dmax}$, is applied. In practice, the intermediate preliminary voltages are stepped so that, to the viewer, the corresponding changes of visible light appear to be of uniform degree. Thus, the intermediate preliminary voltages may not be uniformly stepped from each other.

Figure 4:
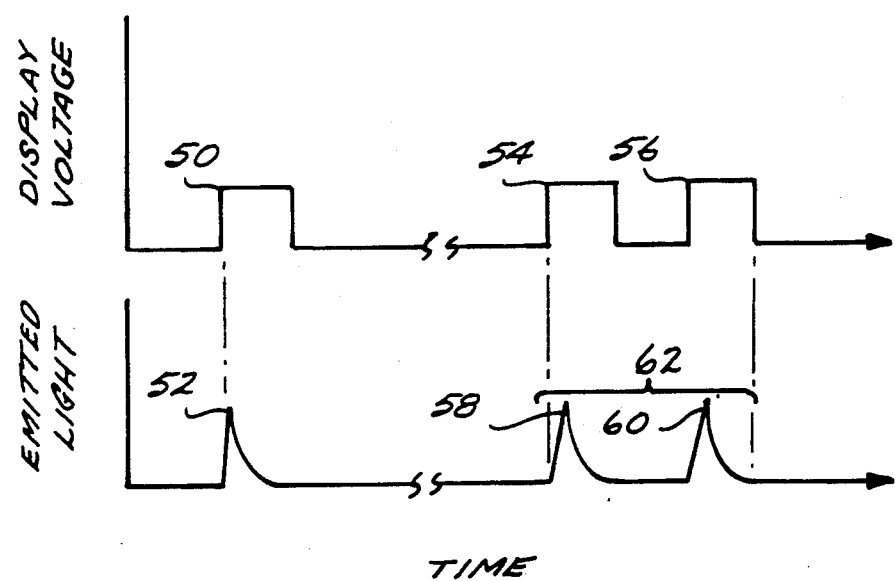
FIG. 4 is a diagrammatic representation of the relationship between applied drive voltage emitted light and perceived light for an AC TFEL display panel.

In practice, in many AC-type TFEL display panels 12, a display voltage is repeatedly developed across each of the pixels 22, during a very short time period in order to excite the pixels 22 to emit a readily observable amount of light. As depicted in the timing diagrams of FIG. 4, in an AC TFEL display panel 12, when a voltage change, represented by pulse 50, is applied across a pixels 22 a given number of photons, light pulse 52, is emitted therefrom. Often a single light pulse 52 does not contain enough light that it is readily observable by the viewer. Increasing the time period the display voltage is applied across the pixels 22 beyond a given period only marginally increases the amount of emitted light. Moreover, increasing the time period the display voltage is applied to the individual pixels 22 can make it difficult, if not impossible, to apply the display voltage to all the pixels 22 fast enough so that the viewer sees an entire image on the display panel 12 without any distracting flicker. As represented by curve 38 of FIG. 3, beyond a certain level, increasing the display voltage applied to the pixels 22 causes only a marginal increase in emitted light. Furthermore, increasing the level of display voltage applied to the pixels 22 beyond a certain level may cause the pixels 22 to burn out and render the display panel 12 useless.

Consequently, a preferred technique to cause readily observable light to be emitted from an AC TFEL display panel 12 is to successively apply a display voltage to a pixel 22 as represented pulses 54 and 56. The successive applications of the display voltage result in the successive emission of light, represented by pulses 58 and 60 respectively, that, in turn, the viewer perceives as a bright, readily-observed continuous emission of light 62.

One method of successively applying a display voltage across the pixels 22 in a short period of time is to symmetrically drive the display panel 12 by providing a period of time called a frame, or where the one set of electrodes in the display panel 12, typically the row electrodes 26, are sequentially provided with a positive write voltage, and HV+, and a second frame, shortly after the first, where a negative write voltage, HV−, is applied to the electrodes 26. As a write voltage is applied to each row electrode 26, the modulation voltage is selectively applied to each column electrode 24 so that, depending on the polarity of the write voltage, sufficient voltage is developed across selected pixels 22 so that light is emitted therefrom.

Symmetrically driven TFEL display panels 12 can be operated by applying the same polarity write voltage to each row electrode during a single frame and then reversing the polarity of the write voltage in the next frame. Alternatively, symmetrically driven display panels 12 operate by providing write voltages that alternate polarity on a row-by-row basis in one frame, and shift polarities of the applied write voltages in a succeeding frame.

Figure 5:
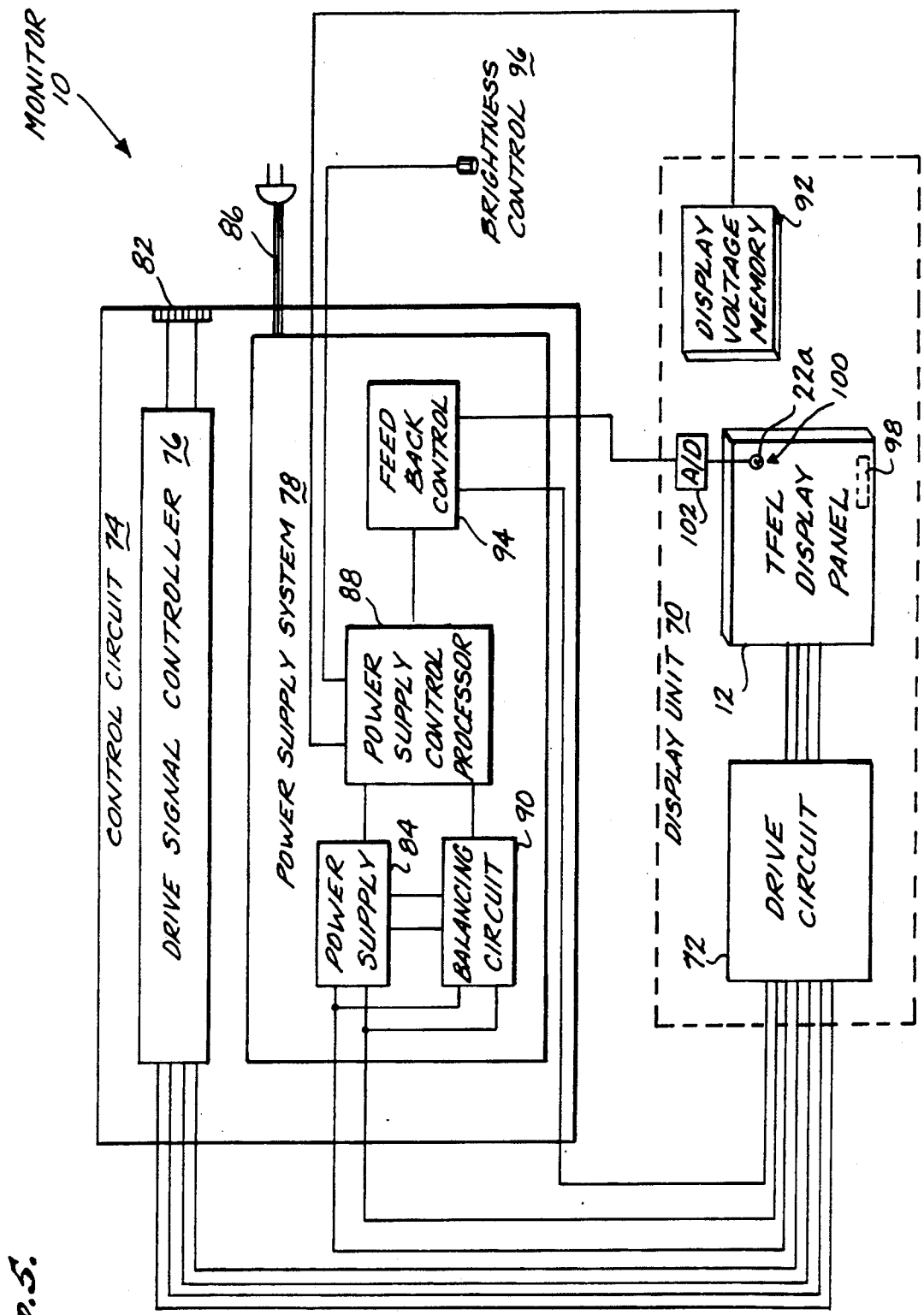
FIG. 5 is a block diagram of the internal components of the TFEL display panel monitor including the power supply system of this invention.

With this basic understanding of how visible light is emitted from a TFEL display panel 12, the internal elements of the monitor 10 will be described with reference to FIG. 5. The display panel 12 is typically part of larger display unit 70 that includes a drive circuit 72 for selectively providing the row and column electrodes 24 and 26 with the necessary drive voltages to cause the pixels 22 to selectively emit light. The drive unit 70 is often assembled so that the display panel 12 and the printed wiring board containing the drive circuit 72 (not illustrated) are inserted and removed from the monitor 10 together. A control circuit 74 is connected to the drive circuit 72 for providing the necessary display drive signals that the drive circuit 72, in turn, uses to selectively establish the drive voltages across the pixels 22. The control circuit 74 is typically located in the rear of the monitor 10 and securely fastened thereto.

The control circuit 74 includes a drive signal controller 76 and a power supply system 78. The drive signal controller 76 receives display signals over input lines 82 from external sources of the images to be represented on the display panel 12. In response to receiving the display signals, the drive circuit controller 76 generates the display drive signals that the drive circuit 72 uses to establish which of the pixels 22 should be excited to emit light.

The power supply system 78 supplies the necessary drive voltages that are applied to the electrodes 24 and 26 to excite the pixels 22. The power supply system 78 includes a power supply 84 that converts an input voltage from a power line 86 into the one or more voltages required by the display panel 12. For example, the power supply 84 for a symmetrically driven AC TFEL display panel 12 produces at least a positive write voltage, a negative write voltage and a modulation voltage. A power supply control processor 88 provides overall control of the drive voltages generated by the power supply 84. A balancing circuit 90 regulates the generated voltages so that they are maintained at the proper level with respect to each other. A display voltage memory 92 provides information regarding the voltage requirements of the display panel 12 coupled to the monitor. A feedback circuit 94 monitors the light emitted by the monitor, so that the levels of display voltages can be automatically adjusted. The power supply system 78 further includes a brightness control 96 that allows the viewer to adjust the brightness of the displayed image by setting the level of one or more of the display voltages.

The power supply control process 88 is typically a digital microprocessor that may provide overall control of the power supply 84. The processor 88 is adapted to exchange input and output signals with the balancing circuit 90, the display voltage memory 92, the feedback circuit 94, and the brightness control 96, and, in response thereto, control the output level of the drive voltages. Integral with the power supply control processor 88, though not illustrated, are the permanent and volatile memories, input/output lines and controllers, and analog-to-digital and digital-to-analog converters that are necessary to the operation of the processor 88, and that enable the exchange of signals with the other components of the power supply system 78.

The display voltage memory 92 contains data that either directly, or indirectly through the power supply control processor 88, are used to control the drive voltages provided by the power supply 84. The display voltage memory 92 may, for example, contain data representative of the threshold voltage, the positive write voltage, the negative write voltage, and/or the modulation voltage. In many embodiments of the power supply system 78, the display voltage memory 92 need only contain data representative of the threshold voltage level of the display panel 12. As depicted in FIG. 5, though the display voltage memory element 92 is accessed by the power supply system 78, it is physically located within the display unit 70 so that it can be replaced or reset each time a new display panel 12 is inserted into the monitor 12. Usually the voltage memory element is located on the drive circuit 72 printed wiring board.

The actual form of the display voltage memory 92 can vary as is required by manufacturing, cost, or maintenance considerations. The display voltage memory 92 can supply the necessary data in either digital or analog form. If a digital display voltage memory 92 is used, it can take the form of a removable ROM or PROM memory chip that is removed or reset each time a display panel 12 with different voltage requirements is installed in the monitor 10. Alternatively, a digital voltage memory element 92 may take the form of one or more switch arrays on the drive circuit 72 printed wiring board that are reset whenever a display panel 12 with different voltage requirements is installed. In analog form, the display voltage memory 92 may take the form of one or more replaceable or variable resistor elements that provide the basis for a constant voltage or constant current that is representative of the required voltage information. An advantage of providing an analog display voltage memory 92 is that it can require a minimum number of signal lines for the necessary signal transfer to the display drive system. This is in contrast to most digital memory elements 92 which typically require six or more signal lines to transfer the necessary data.

The display voltage information required to be entered into the display voltage memory 92 is made available on or with each TFEL display panel 12. In one embodiment, the manufacturer of the display panels 12 provides each panel with a concealed bar code label (shown in phantom at 98), that contains the necessary voltage information for that panel 12. When the display panel 12 is assembled to the driver circuit 72 to form the display unit 70, the technician uses an optical scanner to read the bar code label 98 that, in turn, loads the information into a PROM. Alternatively, the display panel manufacturer can provide the voltage information, in the form of a numeric code printed on each panel 12 or with the supporting documentation. The technician can then use that information to set the switches in a digital memory element, or make simple resistance adjustments to an analog memory element.

The feedback circuit 94 of the power supply system 78 includes a photodetector 100 that is positioned adjacent the face of the display panel 12 to monitor the light emitted from a number of concealed pixels 22a on the panel 12. The concealed pixels 22a can be located in an area at the perimeter of the display panel 12 underneath the frame assembly 20, and the photodetector 100 is secured to the frame assembly 20. Alternative placement of the concealed pixels 22a, so that they do not distract from the normal viewing of the display panel 12 is, of course, possible.

The signal generated from the photodetector 100, which may be a photocell, a photodiode, a phototransistor, or any other light-sensitive transducer, is fed to an analog-to-digital converter 102 that generates digital signals representative of the light emitted by the concealed pixels 22a to the display drive system. The power supply system 78 then uses the information from the photodetector 100 to further control the display voltages the power supply 84 provides for application to the display panel 12.

There are a number of ways that the emitted light monitored by the feedback circuit 94 can be applied to control the voltage applied from the power supply 78. Over time, the brightness-applied drive voltage profile for a display panel 12 may change. Returning to FIG. 3, the initial brightness-applied drive voltage profile, represented by curve 38, may shift to, for example, the brightness-display voltage profile represented by curve 104. Differences in profiles are exaggerated for purposes of illustration. In the illustrated example, at the high end of the curve 104, a higher drive voltage must be applied to the pixels 22 to cause them to emit the same amount of light as in curve 38. At the low end of the curve 104, low drive voltages applied to the display panel 12 may start to excite the pixels 22 to the point where visible light is emitted.

The feedback circuit 94 can be used in conjunction with the power supply control processor 88 to control the power supply 84 when the monitor 10 is initially turned on. During the start-up process, one or more test display voltages are applied across the concealed pixels 22a through the electrodes 24 and 26 associated therewith. This may be done prior to any image appearing on the observable surface of the display panel 12, so as to not confuse the viewer. The brightness of light emitted as a consequence of the application of the test display voltages is sensed by the photodetector 100 and, subsequently, the measurements are supplied to the power supply control processor 88. Upon receiving the measured brightness values for display voltages, the processor 88 establishes an internal brightness-applied voltage table which it then uses to calculate one or more current critical voltages for the display. The processor 88 then uses calculated critical voltages to control the voltages that the power supply 84 generates as drive voltages, so as to insure that the correct amount of light is emitted.

In one embodiment of the invention, the power supply control processor 88 uses the brightness-versus-applied voltage table to establish only one critical voltage, the threshold voltage. The processor 88 then relies on internally maintained algorithms to generate the control signals that are responsible for power supply to generate the appropriate voltages, the write and modulation voltages, that are required. Alternatively, the processor 88 can be provided with a number of internal point-finding algorithms for determining the required control signals for each required display voltage directly from the brightness-applied display voltage table.

Once the initial drive voltage control signals are generated, the monitor 10 can then be used to display the desired material. During the operation of the monitor 10, the concealed pixels 22a are excited at a frequency consistent with the rate the user-observed pixels 22 are excited, in order to simulate the latter's use.

During operation of the monitor 10, it may be desirable to verify that the brightness-applied drive voltage characteristics of the display panel 12 have not changed, and that the power supply 84 is providing the correct voltages. This is done by using the feedback circuit 94 to establish an updated brightness-applied display voltage table for the display panel 12. The power supply control processor 88 then recalculates the critical voltage(s) and, if necessary, adjusts the control signals to the power supply 84 so that the voltages provided by the power supply 84 are adjusted appropriately.

The feedback circuit 94 is also employed by the power supply system 84 to regulate the viewer-controlled brightness adjustment of emitted light. The brightness control 96 operates by regulating the level of drive voltages that are applied across the pixels 22 to emit light. The brightness control 96 is set so that for a given degree of adjustment, the drive voltage change is such that there is a constant change in observed brightness. In other words, throughout the range of brightness control settings, a constant change in brightness is observed by the viewer.

Changes in the brightness-applied display voltage profile can disrupt the operation of the viewer-set brightness controls 94. This is because a given drive voltage change may not result in a constant brightness change for all the brightness-applied drive voltage profiles that may develop during the lifetime of the display panel 12. When the brightness-applied drive voltage profile fluctuates, adjustments of the brightness control 96 may not cause resultant brightness changes that appear to be of uniform degree to the viewer. Depending on the change of the brightness-applied drive voltage profile, a first change or step in decreasing observed brightness may result in a significant change in observed brightness, while a second change may result in only a minor difference in observed brightness levels. These variations in brightness changes can be disruptive to the viewer, and, if they are very extreme, can render the brightness control 96 functionally useless.

The feedback circuit 94, in combination with the power supply control processor 88, automatically adjusts the brightness control-set drive voltage levels to compensate for changes in the brightness-applied drive voltage profile. The power supply control processor 88 uses the data from the feedback circuit 94, obtained from the brightness-applied voltage table, to determine intermediate voltage levels that, when applied to the display panel 12, produce graduations in observed light that appear uniform to the viewer. In one process, the processor 88 establishes the appropriate intermediate applied voltages by reference to internally stored brightness values that, when sequentially observed, appear to change at a uniform rate. Alternatively, the processor 88 calculates the slope of the brightness-applied drive voltage profile and then determines appropriate intermediate display voltages with reference to selected brightness graduations along the profile. The calculated, intermediate applied voltage levels are then referenced by the processor to control changes in the voltage applied from the power supply when the brightness control 96 is set.

Figure 6:
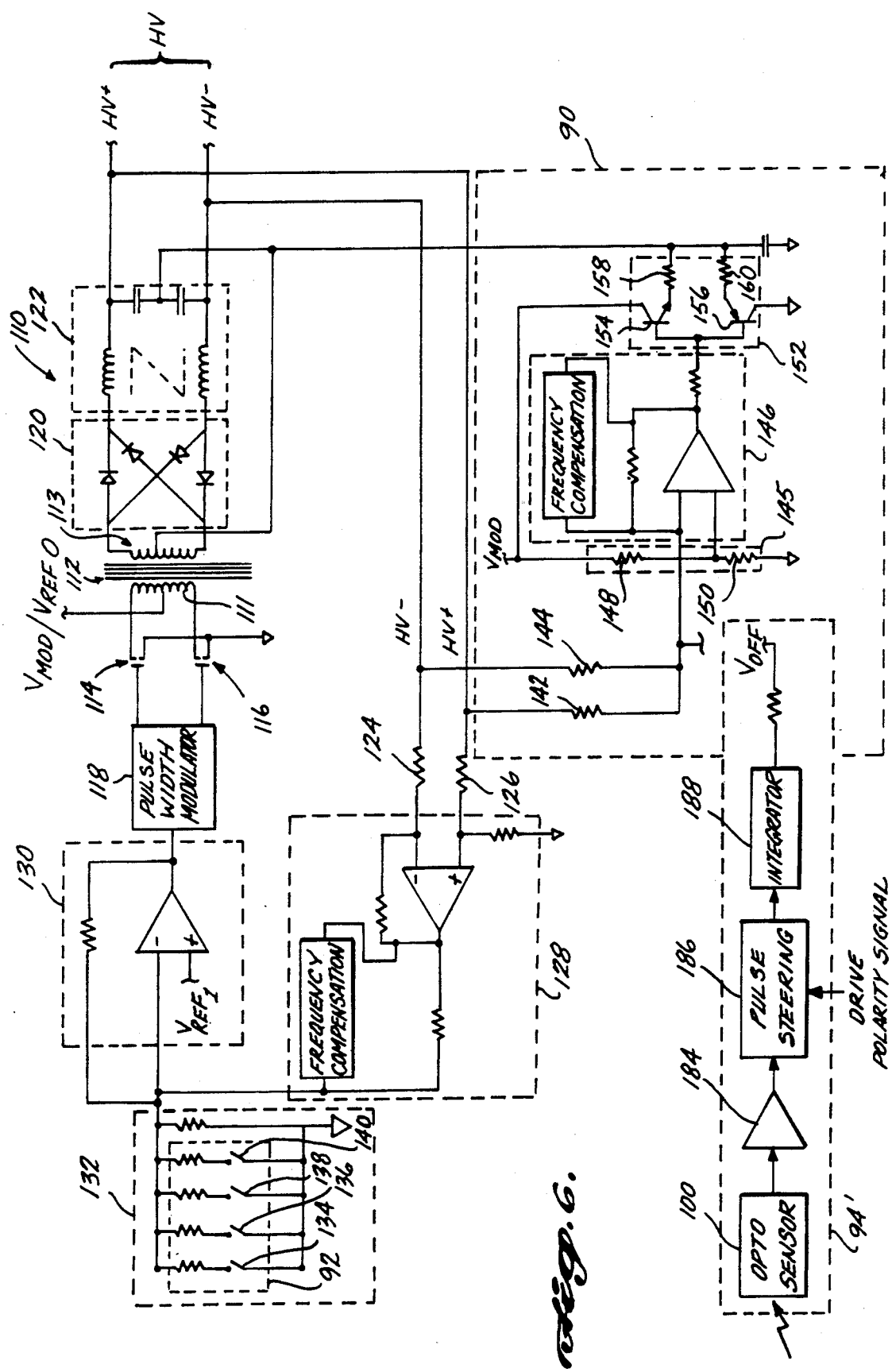
FIG. 6 is a more detailed schematic diagram of an embodiment of a power supply system of this invention.

In a power supply used to generate symmetric drive voltages, the balancing circuit 90 is used to control the positive and negative write voltage levels. FIG. 6 depicts a portion 110 of the power supply 84 used to generate positive and negative write voltages and the balancing circuit 90. In the depicted embodiment, level write voltages are generated with respect to a center-tapped secondary winding 113 of a high voltage transformer 112. The modulation voltage, or other suitable constant DC reference signal, $V_{ref0}$, is applied to the center tap of the primary winding of transformer 112. The reference voltage is modulated across the primary winding 111 by a pair of FET switches 114 and 116 that alternatively tie each end of the primary winding 111 to ground. A pulse width modulator 118 controls the switches 114 and 116 to control the duty cycle at which the reference voltage is modulated across the primary winding 111, and, accordingly, the level of the write voltages that develop across the secondary winding 113. A rectifier circuit 120 separates the voltage developed across the secondary winding 113 into its positive and negative components. An impedance circuit 122 filters the rectified voltages to produce the positive and negative write voltages at the desired frequency.

A portion of the positive and negative write voltages is then used to provide feedback for controlling the pulse width modulator 118. The positive and negative write voltages are both supplied, through resistors 124 and 126 respectively, to a differential amplifier circuit 128 that generates an output signal representative of the total high voltage, HV, the positive write voltage, and the absolute value of the negative write voltage. A portion of the total high voltage is applied to an error amplifier circuit 130 that compares it to a reference voltage $V_{ref1}$. The portion of the high voltage signal applied to the error amplifier circuit 130 is reduced by a divider circuit 132 tied between the input to the amplifier circuit 130 and ground. The output of the error amplifier circuit 130 is applied to the pulse width modulator 118 for controlling the duty cycle at which reference voltage is modulated across the primary winding 111 and, in turn, the write voltages developed across the secondary winding 113.

The write voltages developed across the secondary winding 113 of the transformer 112 can be controlled by varying either the position of the total high voltage or the reference voltage, $V_{ref1}$, applied to the error amplifier circuit 130. The portion of the high voltage signal applied to the error amplifier circuit 130 is reduced by a divider circuit 132 tied between the input to the amplifier circuit 130 and ground. For example, the total resistance of the divider circuit 132 may be controlled by selective setting of switches 134, 136, 138, and 140, which are DIP switches located on the driver circuit 72 printed wiring board that serve as the display voltage memory 92. The reference voltage, $V_{ref1}$, may be controlled by the power supply control processor 88 in response to display panel 12 brightness information from the feedback circuit 94 and/or brightness adjustments made by the viewer through the brightness control 96.

In one embodiment of a monitor 10 with an AC display panel 12 that is symmetrically driven, the following relationships should be maintained between the threshold voltage, the positive write voltage, the negative write voltage, and the modulation voltage.

Vmod = Drive voltage over Vth + Drive voltage below Vth, where the drive voltage is the voltage across a pixel 22

HV+ = 2×Vth + Drive voltage over threshold

HV− = Vmod/2 − HV/2

Thus, for a display panel 12 having a threshold voltage of 165 v and a requirement to drive it from 5 volts below the threshold to 35 volts above the threshold, the voltage requirements are:

$$Vmod = 35 + 5 = 40 \text{ v}$$

$$HV = 2 \times 165 + 35 - 5 = 360 \text{ v}$$

$$HV+ = 360/2 + 40/2 + 200 \text{ v}$$

$$HV- = 40/2 - 360/2 = -160 \text{ v}$$

In other words, during a frame when a positive write voltage 200 v is applied to a row electrode 26, a potential of 40 volts is applied to the complementary column electrodes 24 of the row pixels that are to remain dark, and the column electrodes 24 associated with the row pixels 26 set to emit light are grounded. During frames when the negative write voltage, −160 v, is applied to the row electrodes 26, the column electrodes 24 of the pixels 22 that should be dark are set to ground, while the column electrodes 24 associated with the pixels 22 set to emit light receive a 40 volt potential.

The voltage on the center tap of the secondary winding 113 of the transformer 112, the point the positive and negative write voltages are referenced to, is established by the balancing circuit 90 to balance the write voltages around Vmod/2. The positive and negative write voltages are added through resistors 142 and 144, respectively, into an input of differential amplifier circuit 146. The summed write voltages are compared by the amplifier circuit 146 to Vmod/2 which is obtained from a voltage divider 145 consisting of a matched pair of series-connected, grounded resistors 148 and 150 that Vmod is applied to.

The output of the differential amplifier is applied to an amplifier 152 consisting of transistors 154 and 156 and resistors 158 and 160, that is driven by the modulation voltage. The amplifier 152, in response to the comparison of the summed write voltages to one-half the modulation voltage, applies an offset signal to the center tap of transformer secondary winding 113. The offset voltages balance the positive and negative write voltages so that they stay symmetric around one-half the modulation voltage.

Figure 7:
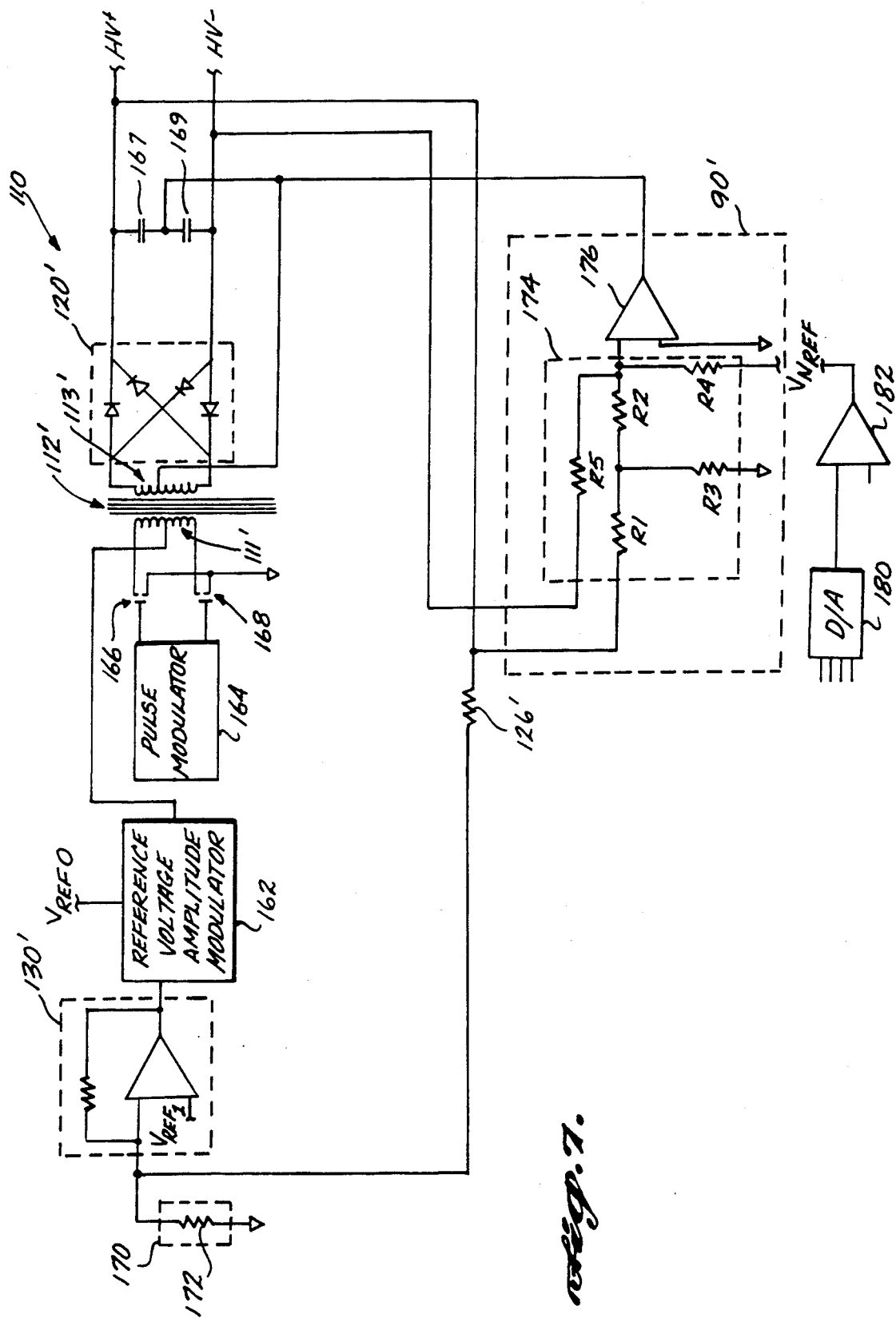
FIG. 7 is a detailed schematic diagram of an alternative embodiment of the power supply system of this invention.

An alternative embodiment of a write voltage portion 110' and a balancing circuit 90' are depicted in FIG. 7. The write voltage power supply includes a transformer 112', a rectifier circuit 120' and an error amplifier circuit 130' that are identical in function to those described in the first write voltage power supply 110. In this portion 110', the total level write voltages are controlled by varying the voltage of the reference voltage, $V_{ref0}$, that is applied to the center tap of transformer primary winding 111'. The output signal from the error amplifier circuit 130' is supplied to a reference voltage amplitude modulator 162 for controlling the fraction of the reference voltage applied to the transformer 112'. A pulse modulator 164, in combination with a pair of FET switches 166 and 168, alternatively ties each end of the primary winding 111' to ground, at a constant duty cycle, in order to cause an inductive field to develop across the transformer 112'. Capacitors 167 and 169 located in series across the output of the rectifier circuit 130' provide sufficient filtering of the outputted write voltages.

In this embodiment of the invention only the positive write voltage is supplied as feedback, to the error amplifier 130' to control the write voltage dividers. Resistor 126' and divider circuit 170, located between the input to the error amplifier circuit 130' and ground, control the fraction of the positive write voltage applied to the error amplifier circuit 130'. In this portion 110', the divider circuit 170 has a constant resistance indicated by a single resistor 172. Thus, the fraction of the positive write voltage applied to the error amplifier 130' is constant. The amplitude of the write voltage is controlled in response to the specific voltage requirements of the display panel, the viewer-set brightness adjustments and brightness adjustments required by the feedback circuit 94, by varying the reference voltage, $V_{ref1}$, into the error amplifier 130'. As with the previous embodiment, the reference voltage, $V_{ref1}$, can be set by the power supply control processor 88 in response to the above-discussed input factors and supplied to the error amplifier circuit 130' through a digital-to-analog convertor circuit.

The balancing circuit 90' supplies an offset voltage to the center tap of the transformer secondary winding 113' for controlling the write voltage levels. The balancing circuit 90' includes a resistance circuit 174 to which are applied the positive and negative write voltages, and a negative reference voltage, $V_{Nref}$. The output of the resistance circuit 174 is applied to an operational amplifier 176 operated in the inverting mode, the output of the resistance circuit 174 is applied to. Setting Resistance $R_2$=Resistance $R_3$, and proper selection of the resistance of the remaining resistors, $R_1$, $R_4$, and $R_5$, yields the following relationship:

$$HV- = -(HV+) + \frac{\text{Resistance } R_5}{\text{Resistance } R_4} V_{Nref}$$

The resistances of $R_4$ and $R_5$, and the voltage of $V_{Nref}$ are selected such that:

$$\frac{\text{Resistance } R_5}{\text{Resistance } R_4} V_{Nref} = V_{mod}$$

Thus the output signal from the amplifier 176 is applied as an offset voltage to the center tap of transformer secondary winding 113' that maintains the level of the write voltages so that they are symmetric to each other with respect to one-half the modulation voltage.

Alternatively, the feedback circuit 94 can be used with the balancing circuit 90 to insure that the write voltages are also symmetric with respect to the light emitted by the display panel 12. The feedback circuit can monitor the light emitted during these write stage steps because the photodetector 100, unlike the human eye, can detect and discern the brightness differences between very small, very fast emissions of light. The feedback circuit 94 establishes which polarity of write voltage causes more light to be emitted by the display panel 12. If there is a significant disparity in emitted light between the different write voltages, an offset signal is applied to the balancing circuit 88 which changes the relationship between the write voltages. For example, if the feedback circuit detects that less light is emitted when the negative write voltage is applied than when the positive write voltage is applied, an appropriate offset signal is supplied to the balancing circuit, which, in response, increases the negative write voltage level to cause a subsequent increase in emitted light.

There are a number of different techniques for employing the output of the feedback circuit 94 to adjust the balancing circuit 90. In one embodiment of the invention, the output of the feedback circuit is applied to the power supply control 88, which, in turn, monitors the differences in emitted light and generates an appropriate offset signal. As depicted in FIG. 7, the offset signal may be a digital signal that is first processed by a digital-to-analog converter 180. The analog representation of the offset signal is then applied to an amplifier 182 that controls the level of the reference voltage, $V_{Nref}$, applied to the balancing circuit 90'. In still other embodiments of the power supply system 78, it may be desirable to apply the output of the amplifier 182 as an offset signal to the resistance circuit 174.

Figure 6A:
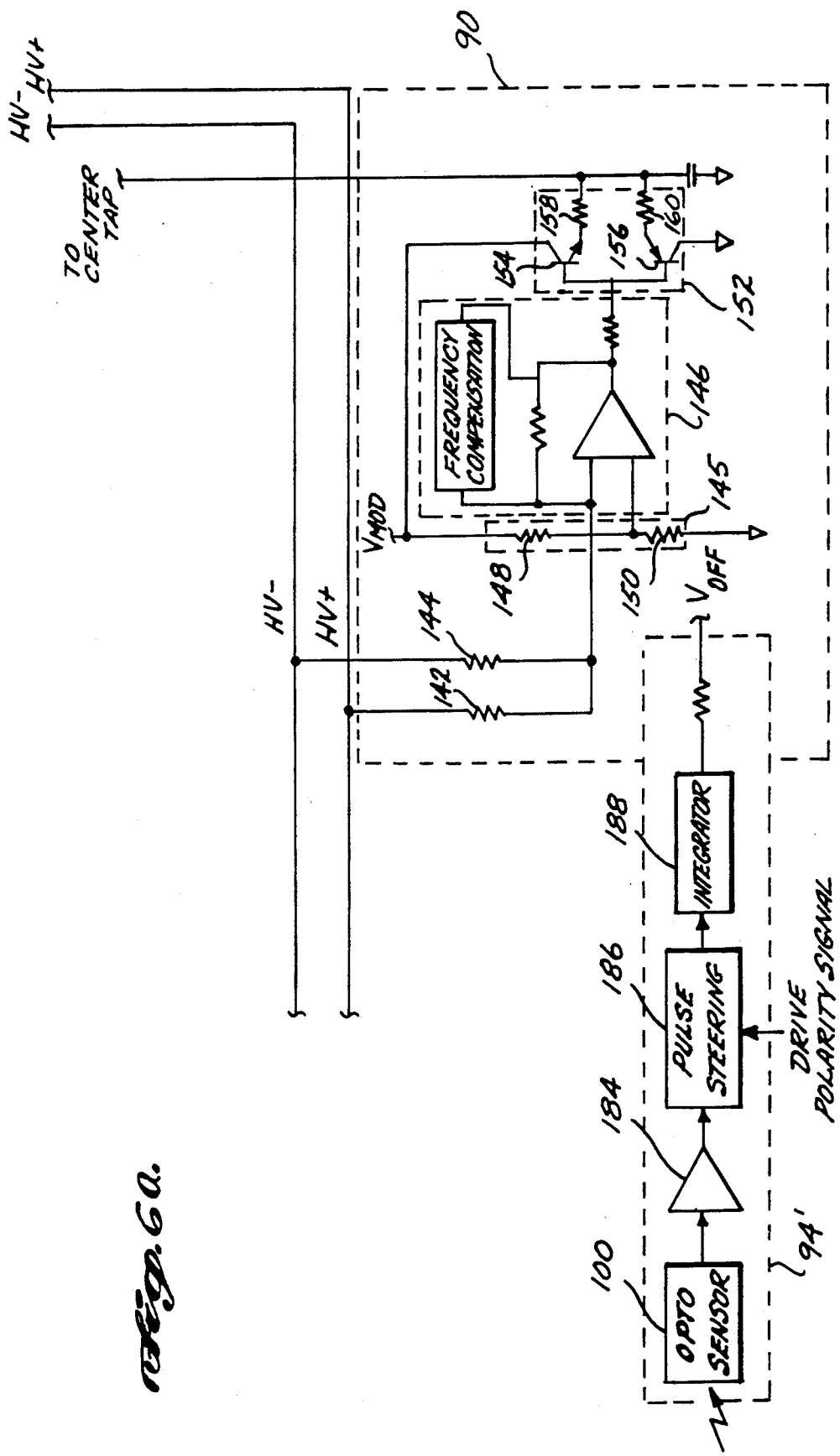
FIG. 6a is a detailed schematic diagram illustrating an alternative means of interconnecting the feedback circuit to the balancing circuit of FIG. 6.

Alternatively, as depicted in the block diagram portion of FIG. 6, an embodiment of the feedback circuit 94' may include an amplifier 184 for receiving the output of the photodetector 100. The output pulses from the amplifier 184 are then supplied to a pulse inverter 186 that inverts every other signal pulse to distinguish between signals that result from applications of positive write voltage, and signals due to the application of negative write voltage. The pulse signals are then processed by an integrator 188 which, in response to any difference between the sum of the signals of the different polarities write voltages, generates an offset voltage, $V_{off}$, that is applied to the sum of the write voltages supplied to the balancing circuit 90. The offset voltage could, of course, be supplied to the balancing circuit at any other appropriate location, for example into the voltage divider 145, as depicted in FIG. 6a. Feedback circuit 94' can, of course, be used with other embodiments of the power supply, for example, the write voltage power supply 110' depicted in FIG. 7.

The power supply system 78 of this invention controls the level of drive voltages applied to the TFEL display 12. The display voltage memory 92 provides a ready means of interchanging display panels 12 with the monitors 10 that they are used without having to spend time recalibrating the power supply 84 to adjust for the drive voltage requirements of the new display panel 12. Placing the required display voltage on or with the display panel 12 in machine-readable form allows error-free entry of the voltages into any machine-programmable display voltage memory 92. Locating the display voltage memory 92 on the drive control 72 printed wiring board, or any portion of the display unit 70 replaced with the display panel 12, further contributes to the ease of display panel 12 replacement, since technician time does not have to be expended accessing the rear of the monitor 10 to replace or reset the memory 92.

The feedback circuit 94 provides a means to control changes in the light emission from the display panel 12 as they occur. The feedback circuit 94, by controlling drive voltages in response to detected light emissions, provides an automatic adjustment for changes in brightness that occur over both short and long periods of time. In conjunction with the power supply control processor 88, the feedback circuit adjusts the level of the intermediate display voltages that are applied to the display panel for generating dimmed displays. This adjustment assures that whenever the viewer sets the brightness control 96, changes in display brightness appear to be over uniform degree over the range of control settings.

The balancing circuit 90 provides a means of insuring that the positive and negative write voltages applied to a symmetrically driven TFEL display panel 12 are symmetrical with respect to the modulation voltage. This prevents the material forming the components of the display panel 12 from developing an electrical charge, that, over time, can cause either a positive or negative latent image to appear on the panel 12. The described balancing circuit, intended for a symmetrically driven display panel 12, balances the negative write voltage with respect to both the positive write and modulation voltages that are being applied to the panel 12. This allows near instantaneous balancing of the write voltage even if the modulation or total high voltage drift. The balancing circuit 90 also maintains the appropriate write voltage symmetry even if the total high voltage is significantly varied, as may happen when the display panel 12 brightness is adjusted. In other words, the balancing circuit maintains write voltage symmetry even when the brightness control 96 is used to adjust the voltage applied to the display panel 12.

The balancing circuit 90, in combination with the feedback circuit 94, can also be used to balance the write voltages for changes in emitted light between the application of the positive and negative write voltages. Balancing for emitted light, which is addition to or instead of, the voltage balancing, further minimizes the possibility of latent images forming on the TFEL display panel 12.

It is understood that this description is for the purposes of illustration only. It will be readily apparent that this invention can be practiced having diverse basic construction or in systems that use diverse internal circuitry than is disclosed in this specification with the attainment of some or all of the advantages of this invention. For example, the display voltage memory 92, the feedback circuit 94 and the balancing circuit 90 may each be used separately or in any combination to obtain any one or more of the desired advantages of this invention. The power supply control processor 88 may or may not be incorporated into the power supply system 78 depending on which and what form of display voltage memory 92, feedback circuit 94, and balancing circuit 90 are employed.

In still other embodiments of the feedback circuit 94, the photodetector 100 may be located adjacent the edge of display panel 12 and set to produce a signal in response to an image from a selected pixel 22 pattern. In some embodiments of the invention, the feedback circuit 94 on the basis of monitoring the emitted light alone, may be able to control the balancing of write voltages, or other drive voltages, that are applied to the display panel 12. As discussed, the specific components and drive signals used to control the display voltage may all be digital or analogue in nature, or, a combination of the two. Other balancing circuits 90 may be constructed to automatically control other display voltages than those required for symmetrically driven AC TFEL displays.

Therefore, it is the object of the appended claims to cover all such modifications and variations as come within the true spirit and scope of the invention.

The embodiments of the invention in which an exclusive property or privilege is claimed are defined as follows:

1. A power supply for a thin-film electroluminescent display system having an electroluminescent display panel that, in response to the application of a panel display voltage which is above a panel threshold voltage, emits a quantity of light, comprising;
   a power converter having an input for receiving a selectively applied first reference voltage for converting said reference voltage to a panel write voltage, and having an output from which the panel write voltage is applied to the display panel so as to at least partially establish the panel display voltage;
   a feedback link having a first end connected to said power converter output for receiving said panel write voltage and having a second end;
   a divider circuit having a selected resistance connected to said feedback link for producing a feedback signal on said feedback link second end that is a function of the panel write voltage and said divider circuit resistance, wherein said divider circuit resistance is a function of the panel threshold voltage;
   an error comparator connected to said feedback link second end for receiving said feedback signal and a second reference voltage and, in response thereto, generating an error signal; and
   a voltage regulator connected to receive said first reference voltage and connected to said error comparator for receiving said error signal for selectively applying said first reference voltage to said power converter in response to said error signal so as to control development of the panel write voltage.

2. The power supply system of claim 1, wherein said divider circuit includes a manually replaceable resistor element.

3. The power supply system of claim 1, wherein said divider circuit includes a plurality of resistor elements that are manually tied between said feedback link and a ground plane so as to establish said divider circuit resistance.

4. The power supply of claim 1, wherein:
   said power converter is a transformer having a primary winding across which said reference voltage is applied and a secondary winding across which said panel write voltage is developed;
   said feedback link first end is connected to said transformer secondary winding; and
   said voltage regulator selectively applies said first reference voltage to said transformer primary winding.

5. The power supply system of claim 4, wherein said voltage regulator comprises a pulse modulator for selectively applying said first reference voltage across said transformer primary winding at a rate that is a function of said error signal.

6. The power supply system of claim 4, wherein:
said reference voltage regulator comprises a voltage controlled amplitude modulator for producing a varying-voltage modulated first reference voltage that is applied across said transformer primary winding, wherein said modulated first reference voltage is established by said amplitude modulator in response to said error signal.

7. The power supply system of claim 6, wherein:
said first reference voltage is a DC voltage; and
said power supply further includes a pulse modulator for applying said selectively modulated first reference voltage across said transformer primary winding in fixed length pulses.

8. The power supply of claim 4, wherein the panel display voltage is established, in part, by the application of a modulation voltage to the display panel, and wherein:
said transformer secondary winding has opposed ends across which a positive write voltage and a negative write voltage are developed, said positive and negative write voltages are applied to the display panel in a prearranged sequence in combination with the modulation voltage to establish the panel display voltage, and said transformer secondary winding has a center tap; and said power supply further includes:
a balancing circuit connected to said transformer secondary winding for receiving said positive and negative write voltages, and connected to receive a third reference voltage and, in response thereto, generating an offset voltage applied to said transformer secondary winding center tap so that said positive and negative write voltages are maintained at a fixed relationship relative to at least a portion of the modulation voltage.

9. The power supply system of claim 8 further including:
an optical feedback circuit including a photo detector for monitoring light emitted by the display panel and, in response thereto, emitting an optical feedback offset voltage; and wherein
said balancing circuit is connected to said optical feedback circuit for receiving said optical feedback offset voltage, and in response thereto, adjusts said balancing circuit offset voltage.

10. The power supply system of claim 9, wherein said feedback circuit monitors differences between light emitted when said positive write voltage is applied to the display panel and when said negative write voltage is applied to the display panel and, in response thereto, generates said optical feedback offset voltage as a signal representative of any differences between the light emitted when said different write voltages are applied to the display panel.

11. The power supply system of claim 9, wherein said balancing circuit includes a voltage divider to which the modulation voltage and said optical feedback offset voltage are applied, and a comparator having a first input connected to said transformer secondary winding for receiving a signal representative of the sum of said positive and negative write voltages, and a second input connected to said voltage divider for receiving a selected fraction of the modulation voltage and said optical feedback offset voltage signal and, in response thereto, producing a signal representative of said balancing circuit offset voltage.

12. The power supply of claim 8 wherein the modulation voltage is said first reference voltage and said third reference voltage.

13. The power supply of claim 1 wherein said first reference voltage and said second reference voltage are separate voltages.

14. A power supply for an electroluminescent display system having an electroluminescent display panel that, in response to the application of a panel display voltage, emits a quantity of light that is a function of the panel display voltage, and to which a modulation voltage is supplied, comprising:
a transformer having primary and secondary windings wherein a first reference voltage is applied to said transformer primary winding and wherein positive and negative write voltages are developed across said transformer secondary for application to the electroluminescent display panel to establish the panel display voltage in combination with the modulation voltage and wherein said transformer secondary winding has a center tap; and
a balancing circuit connected to said transformer secondary winding for receiving said positive and negative write voltages and connected to receive a reference voltage and, in response thereto, generating an offset voltage applied to said transformer secondary winding center tap so that said positive and negative write voltages are maintained at a fixed relationship relative to at least a portion of the modulation voltage.

15. The power supply system of claim 14, wherein said balancing circuit offset voltage balances said positive and negative write voltages so that said positive and negative write voltage are symmetric around one-half of the modulation voltage.

16. The power supply system of claim 14, wherein said balancing circuit includes a summing circuit connected to said transformer secondary winding for receiving said positive and negative voltages and, in response thereto, producing a write voltage sum signal, and a comparator having a first input connected to said summing circuit for receiving said write voltage sum signal, and a second input adapted to receive a signal representative of a portion of the modulation voltage as said reference voltage, and in response thereto, generates a comparator signal representative of said balancing circuit offset voltage.

17. The power supply system of claim 16, wherein said balancing circuit includes: a voltage divider across which the modulation voltage is applied and said comparator second input is connected to said voltage divider for receiving one-half of the modulation voltage so that said comparator signal represents a difference between the sum of said positive and negative write voltages; and, an amplifier for receiving said comparator signal and that in response thereto produces said balance circuit offset voltage so that said positive and negative write voltages are symmetric about one-half of the modulation voltage.

18. The power supply circuit of claim 14, wherein the deference between the absolute value of said positive write voltage and the absolute value of said negative write voltage is equal to the modulation voltage, and
said balancing circuit comprises a resistance circuit connected to said transformer secondary winding for receiving said positive and negative write voltages and a reference voltage, wherein said resistance circuit is arranged to produce an output signal equal to a voltage that is a function of the modulation voltage, and an amplifier for receiving said resistance circuit output signal and, in response thereto, generating said balancing circuit offset voltage.

19. The power supply system of claim 18, wherein said balancing circuit offset voltage balances said positive and negative write voltages so that said positive and negative write voltages are symmetric around one-half of the modulation voltage.

20. The power supply system of claim 14 further including:
an optical feedback circuit including a photo detector for monitoring light emitted by the display panel and, in response thereto, emitting an optical feedback offset voltage; and
wherein said balancing circuit is connected to said optical feedback circuit for receiving said optical feedback offset voltage, and in response thereto, adjusts said balancing circuit offset voltage.

21. The power supply system of claim 20, wherein said feedback circuit monitors differences between light emitted when said positive write voltage is applied to the display panel and when said negative write voltage is applied to the display panel and, in response thereto, generates said optical feedback offset voltage as a signal representative of any differences between the light emitted when the different write voltages are applied to the display panel.

22. The power supply system of claim 21, wherein when said optical feedback offset voltage indicates the display panel emits the same amount of light when said positive and negative write voltage are applied thereto, said balancing circuit offset voltage balances said positive and negative write voltages so that the write voltages are symmetric about one half the modulation voltage.

23. The power supply system of claim 21, wherein said balancing circuit includes a voltage divider to which said modulation voltage and said optical feedback offset voltage are applied, and a comparator having a first input connected to said transformer secondary winding for receiving a signal representative of the sum of said positive and negative write voltages, and a second input connected to said voltage divider for receiving a selected fraction of the modulation voltage and said optical feedback offset voltage signal and, in response thereto, producing a signal representative of said balancing circuit offset voltage.

24. The power supply system of claim 23, wherein when said optical feedback offset voltage indicates the display panel emits the same amount of light when said positive and negative write voltages are applied thereto, said balancing circuit offset voltage balances said positive and negative write voltages so that the write voltages are symmetric about one-half the modulation voltage.

25. The power supply system of claim 20, wherein when said optical feedback offset voltage is zero, said balancing circuit offset voltage balances said positive and negative write voltages so that the write voltages are symmetric about a voltage level equal to one half the modulation voltage.

26. The power supply system of claim 20, wherein said balancing circuit comprises a comparator having a first input connected to said transformer secondary winding for receiving a signal representative of the sum of said positive and negative write voltages, and a second input adapted to receive a signal representative of a portion of the modulation voltage as said reference voltage and said optical feedback offset voltage and, in response thereto, generates a signal representative of said balancing circuit offset voltage.

27. The power supply system of claim 26, wherein said balancing circuit includes a voltage divider across which the modulation voltage is applied, and said comparator second input is connected to said voltage divider for receiving a selected fraction of the modulation voltage and said optical feedback offset voltage signal and, in response thereto, producing a signal representative of said balancing circuit offset voltage.

28. The power supply system of claim 27, wherein when said optical offset voltage is zero, said balancing circuit offset voltage balances said positive and negative write voltages so that the write voltages are symmetric about one half the modulation voltage.

* * * * *

UNITED STATES PATENT AND TRADEMARK OFFICE
CERTIFICATE OF CORRECTION

PATENT NO. : 5,093,654
DATED : March 3, 1992
INVENTOR(S) : S.D. Swift et al.

It is certified that error appears in the above-identified patent and that said Letters Patent is hereby corrected as shown below:

| COLUMN | LINE | |
|---|---|---|
| 1 | 62 | "change" should be --changes-- |
| 2 | 20 | "an" should be --a-- |
| 5 | 23 | before "display", insert --the-- |
| 6 | 25 | "volution" should be --voltage-- |
| 6 | 44 | "pixels" should be --pixel-- |
| 7 | 9 | delete "and" after "voltage," |
| 13 | 45 - 46 | delete "the output of the resistence circuit 174 is applied to" |
| 14 | 45 | add an apostrophe (--'--) after "polarities" |
| 15 | 16 | "over" should be --of-- |
| 15 | 31 | "drift" should be --drifts-- |
| 15 | 43 | add --in-- after "is" |
| 18 | 19 | insert --winding-- after "secondary" |
| 18 | 36 | "voltage" should be --voltages-- |
| 18 | 63 | "deference" should be --difference-- |
| 19 | 33 | after "indicates" insert --that-- |

Signed and Sealed this

Second Day of November, 1993

*Attest:*

BRUCE LEHMAN

*Attesting Officer*    Commissioner of Patents and Trademarks